No. 627,497.           T. R. GODBEY.           Patented June 27, 1899.
CHECK ROW CORN PLANTER.
(Application filed July 16, 1898.)
(No Model.)
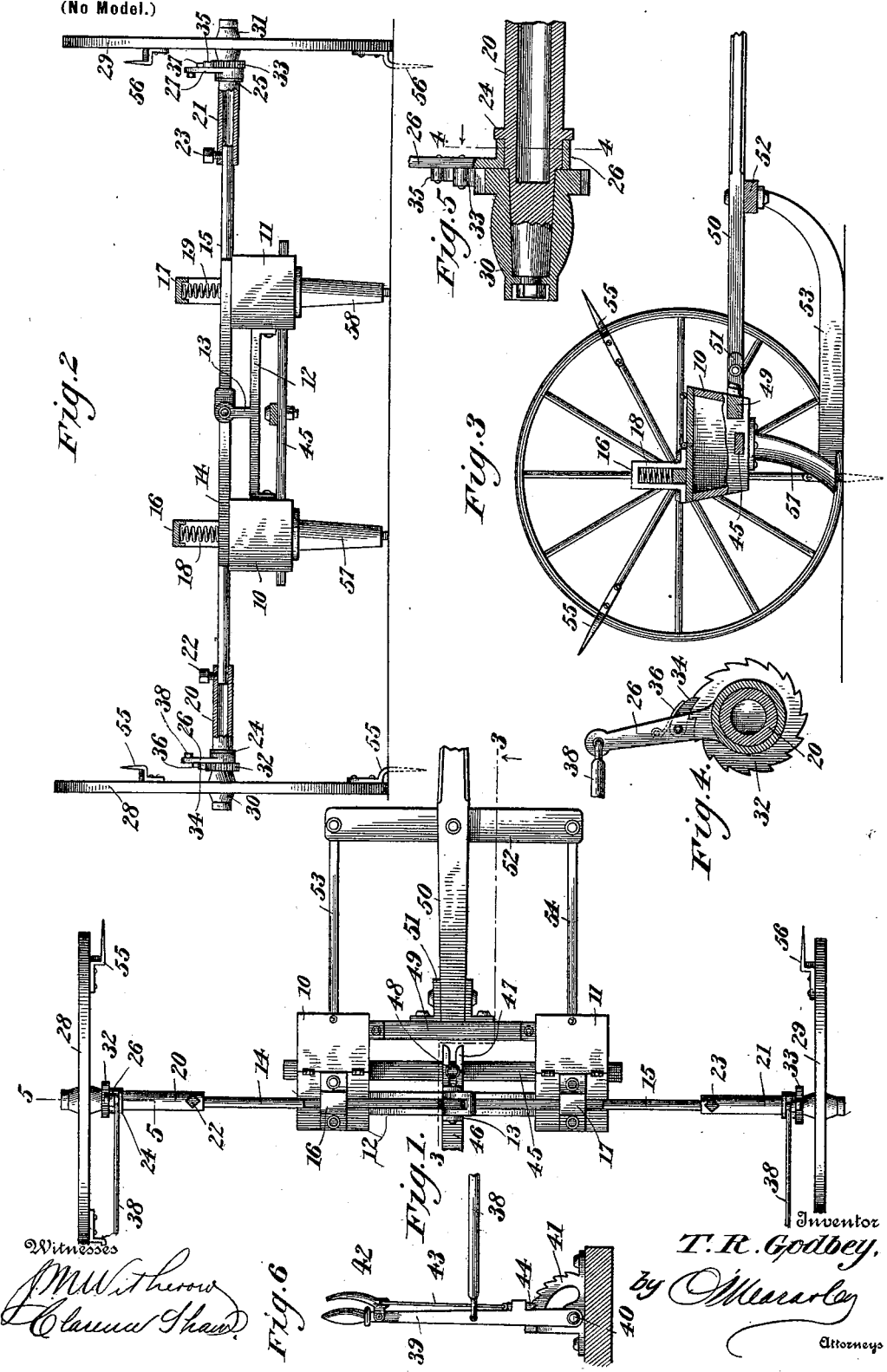

UNITED STATES PATENT OFFICE.

THEADORE R. GODBEY, OF BARNESVILLE, KANSAS.

CHECK-ROW CORN-PLANTER.

SPECIFICATION forming part of Letters Patent No. 627,497, dated June 27, 1899.

Application filed July 16, 1898. Serial No. 686,198. (No model.)

*To all whom it may concern:*

Be it known that I, THEADORE R. GODBEY, a citizen of the United States, residing at Barnesville, in the county of Bourbon and State of Kansas, have invented a new and useful Check-Row Corn-Planter, of which the following is a specification.

This invention relates to certain new and useful improvements in check-row corn-planters, the objects of the invention being to simplify, cheapen, and improve the construction of such devices, whereby the marking of the ground alongside of the hills is facilitated and the planter permitted to pass over stumps and other obstructions without injury.

With these objects in view my invention consists in a check-row corn-planter provided with solid laterally-projecting shafts, marking-wheels mounted upon hollow shafts adapted to slide upon the solid shafts toward or from a planting mechanism, means for securing the solid and hollow shafts in their adjusted positions, means under the control of the driver for independently turning either of the marking-wheels, and improved means for permitting either of the wheels to rise in passing over a stump or other obstruction without effecting the leveling of the planting mechanism or the other wheel.

My invention further consists in the improved construction, arrangement, and combination of parts hereinafter fully described and afterward particularly pointed out in the claims.

In order to enable others skilled in the art to which my invention most nearly appertains to make and use the same, I will now proceed to describe its construction and operation, having reference to the accompanying drawings, forming part hereof, in which—

Figure 1 is a top plan view of a check-row corn-planter constructed in accordance with my invention, the seat being omitted. Fig. 2 is a rear elevation thereof, partly in section. Fig. 3 is a vertical sectional view on the line 3 3 of Fig. 1. Fig. 4 is a detail sectional view on the line 4 4 of Fig. 5, looking in the direction of the arrow. Fig. 5 is a detail sectional view on the line 5 5 of Fig. 1. Fig. 6 is a detail view illustrating a portion of the mechanism for independently turning either of the marking-wheels.

Like numerals of reference indicate the same parts in all the figures of the drawings.

Referring to the drawings by numerals, 10 and 11 indicate the seedboxes, which are rigidly connected together by a cross-bar 12, bolted to their inner sides. The central arm 13 projects upwardly from the cross-bar 12, and to this arm are pivotally secured the solid shafts or axles 14 and 15. Brackets 16 and 17 are rigidly secured to the tops of the seedboxes 10 and 11, straddling axles 14 and 15, and springs 18 and 19, located in said brackets, bear upon the tops of the axles and normally hold them down in line with each other and in contact with the tops of the seedboxes. Hollow shafts or axles 20 and 21 are telescoped upon the outer ends of the solid axles 14 and 15, so as to be slidably adjustable thereon, two bolts 22 and 23 serving to secure them in adjustment. Circumferential flanges 24 and 25 are formed on the hollow axles 20 and 21 near their outer ends, and levers 26 and 27 are swiveled or pivoted upon the hollow axles beyond said flanges. Wheels 28 and 29 are mounted upon the outer ends of the hollow axles, and upon the hubs 30 and 31 of said wheels are formed ratchet-teeth 32 and 33, which engage pawls 34 and 35, pivoted to the levers 26 and 27, said pawls being normally held in contact with the ratchets by springs 36 and 37. To the upper end of each lever 26 and 27 is pivotally connected a rod 38, its opposite end being pivotally connected to a hand-lever 39, pivoted at 40 to the frame of the corn-planter, the rod 38 being formed with an eye at each end to engage in similar eyes in the levers 26 and 39, so as to permit of vertical or horizontal movement at its pivotal points. A toothed rack 41 is also secured to the frame of the corn-planter, curved concentrically with the pivotal point of the lever 39. A trigger or finger-lever 42 lies parallel with the upper end of the hand-lever 39. Pivoted to said hand-lever and connected by means of a rod 43 is a pawl 44, which engages the teeth of the curved rack.

45 indicates the slide-valve, which passes through both seedboxes and is actuated to open or close the seed-discharge-ports by means of a lever 46, pivotally secured to the frame of the machine and having its forward forks 47 embracing a vertical pin 48, projecting from said slide-valve, the arrangement of said slide-valves being well known and forming no part of my invention. A cross-beam 49 is secured between the seedboxes 10 and 11, and the tongue 50 is pivoted between parallel brackets 51, secured to the front of said cross-beam, the tongue being braced by a cross-beam 52 and furrow-openers 53 and 54. The wheels 28 and 29 are provided with points or spades 55 and 56, which project beyond the tires of the wheels and serve to mark the points where corn-hills are to be made, the points or spades 55 and 56 being located at a distance apart equal to the distance between the two spouts 57 and 58 of the seedboxes 10 and 11.

The construction of my invention will be readily understood from the foregoing, and its operation may be described as follows: The seedboxes being filled and the team started, the driver walking behind, or seated upon a seat when one is provided, may by moving the lever 46 at each hill drop the proper regulated number of grains into each hill. The wheels 28 are in the meantime marking lines for the next adjacent row, the spades or points 55 and 56 marking the points where the hills are to come. When it is desired to turn quickly, the lever 39 may be operated to move lever 26, and by means of pawl 34 and ratchet-wheel 32 to turn either of the wheels independently of the other.

In planting close to a fence or other obstacle either of the wheels may be run close up to the seedboxes by sliding the hollow shafts in on the solid shafts and securing them by means of the screw-bolts 22 and 23.

Should either of the wheels pass over a stump, stone, or other obstacle, it will be permitted to rise independently by reason of its pivotal connection with the upright arm 13 of the cross-beam 12 without disturbing the position of the other wheel or the seedboxes. After passing over the obstruction the wheel will drop to its position with the two axles 14 and 15 in alinement with each other, this dropping being facilitated and assured by the assistance of the springs 18 and 19, which also serve to give a yielding support to either of the axles while passing over a stump, stone, or other obstruction, as before described.

Having thus described my invention, what I claim as new, and desire to secure by Letters Patent of the United States, is—

1. In a check-row corn-planter the combination of a pair of seedboxes, a rigid cross-bar connecting them together, a vertical arm extending centrally upward from said cross-bar, axles connected to the top of said cross-bar by horizontal pivots in the line of draft of the planter, wheels journaled on said axles, brackets secured upon the tops of the seedboxes straddling the axles, and springs in said brackets bearing upon the top of the axles, substantially as described.

2. In a check-row corn-planter, the combination with the seedboxes, of the axle mounted thereon, the wheels journaled on the ends of the axles, ratchet-wheels rigidly secured on the wheels, levers swiveled on the axle alongside of the ratchet-wheels, spring-pawls carried by said levers and engaging the ratchet-wheels, a hand-lever with adjusting-rack and pawl pivoted to the frame of the machine, and a loosely-pivoted connection between the hand-lever whereby by actuating the hand-lever, the driver may turn either wheel at will, substantially as described.

THEADORE R. GODBEY.

Witnesses:
L. FARMER,
U. L. NINE.